United States Patent [19]

Kohno et al.

[11] Patent Number: 5,701,700

[45] Date of Patent: Dec. 30, 1997

[54] METHOD FOR STORING GEL-COATED SEEDS

[75] Inventors: Yasushi Kohno, Shizuoka; Masayoshi Minami; Riichi Minamiguchi, both of Osaka, all of Japan

[73] Assignee: Yazaki Corporation, Tokyo, Japan

[21] Appl. No.: 679,263

[22] Filed: Jul. 12, 1996

[30] Foreign Application Priority Data

Jul. 14, 1995 [JP] Japan .................. HEI 7-178411

[51] Int. Cl.⁶ .................. A01C 1/06; A01C 21/00; A01C 1/00; A01B 79/00
[52] U.S. Cl. .................. 47/57.6; 47/58
[58] Field of Search .................. 47/57.6, 58

[56] References Cited

U.S. PATENT DOCUMENTS

| | | | |
|---|---|---|---|
| 4,806,357 | 2/1989 | Garrett et al. | 427/4 |
| 4,808,430 | 2/1989 | Kouno | 427/4 |
| 5,080,925 | 1/1992 | Kouno | 427/4 |
| 5,254,358 | 10/1993 | Kouno et al. | 427/4 |
| 5,334,229 | 8/1994 | Sakamoto | 47/57.6 |

FOREIGN PATENT DOCUMENTS 8701258  3/1987  WIPO .................. A01C 1/06

OTHER PUBLICATIONS

Patent Abstracts of Japan vol. 13, No. 158 (C–586) & JP-A-63 317011 (Yazaki) *abstract*.
Patent Abstracts of Japan vol. 17, No. 364 (C–1081) & JP-A-05 056707 (Yazaki) *abstract*.

Primary Examiner—David T. Fox
Assistant Examiner—Kent L. Bell
Attorney, Agent, or Firm—Sughrue, Mion, Zinn, Macpeak & Seas, PLLC

[57] ABSTRACT

A method for storing gel-coated seeds having a gel coat comprising an aqueous gel having been water-insolubilized by a metal ion, which comprises storing the gel-coated seeds in an aqueous solution containing the metal ion.

5 Claims, No Drawings

METHOD FOR STORING GEL-COATED SEEDS

FIELD OF THE INVENTION

The present invention relates to a method for storing gel-coated seeds of plants.

BACKGROUND OF THE INVENTION

Coating or encapsulating seeds with gel facilitates planting the seeds in the ground and is effective to accelerate germination as described in WO 87/01258. Gel-coated seeds are prepared by coating seeds with gel insolubilized in water by metal ions, e.g., a calcium ion, so as to have a uniform size and an appropriately controlled hardness. The gel coating technique has made it feasible to mechanize planting of even those seeds that are too small to be planted mechanically. Furthermore, because the gel coat surely supplies to the encapsulated seed water necessary for germination, the gel-coated seeds achieve an improved rate of germination.

Preparation of gel-coated seeds requires equipment and chemicals, it is demanded for working efficiency to prepare a large quantity of gel-coated seeds at a time and store them so that they may be planted later according to a planting schedule. However, if gel-coated seeds are stored under the same conditions as for general uncoated seeds, the water content of the gel coat would be reduced, and it is difficult for the gel coat to maintain a water content necessary for germination. Furthermore, the gel coat would be hardened due to loss of water, making it difficult for a bud or a root sprouted from the seed to pierce through the coat and stick out, which results in reduction in yield.

Once a gel coat of a gel-coated seed loses its water content, it is difficult to let the gel coat re-absorb water to restore its original shape and properties. That is, the surface of the gel coat tends to be peeled, the handling properties of the gel-coated seeds are seriously deteriorated, and the gel strength of the gel coat is extremely reduced, resulting in a failure of mechanical planting.

In order to solve the above problem, it has been proposed to incorporate a water-absorbing polymer into the gel coat as disclosed in JP-A-5-56707 (the term "JP-A" as used herein means an "unexamined published Japanese patent application"). However, addition of a water-absorbing polymer not only incurs an increase in viscosity, which makes gel coat formation difficult, but reduces clarity of the gel coat and thereby impairs visibility of the encapsulated seed, which makes it difficult to control the conditions of germination acceleration which is to be conducted before planting.

SUMMARY OF THE INVENTION

In the light of the above-mentioned disadvantages of conventional techniques, an object of the invention is to provide a method for storing gel-coated seeds easily without causing reductions in yield and handling properties.

This and other objects of the present invention have been accomplished by a method for storing gel-coated seeds having a gel coat comprising an aqueous gel having been water-insolubilized by a metal ion, which comprises storing the gel-coated seeds in an aqueous solution containing said metal ion (hereinafter referred to as a storage solution).

DETAILED DESCRIPTION OF THE INVENTION

Gel-coated seeds having a gel coat comprising an aqueous gel having been water-insolubilized by a metal ion can be prepared in a known manner. For example, a droplet of a gel solution is formed at the tip of a capillary, and a seed to be encapsulated is introduced into the droplet by making use of the capillary. The gel droplet containing a seed is dropped in a solution containing a metal ion capable of water-insolubilizing the gel. Such a metal ion is hereinafter referred to as a metal ion for coagulation, and the solution containing the metal ion which is to be used for insolubilizing the aqueous gel in water is hereinafter referred to as a coagulating solution.

The hardness of the gel coat (breaking load) can be controlled appropriately according to the kind of the seed to be encapsulated and the planting conditions by adjusting the concentration of the metal ion for coagulation or the contact time of the aqueous gel layer and the coagulating solution.

The aqueous gel forming the gel layer around a seed includes sodium alginate and sodium polyacrylate.

It is necessary that the concentration of the metal ion in the storage solution used in the invention be lower than that of the metal ion for coagulation in a coagulating solution. If the former concentration is higher than the latter concentration, the gel coat gains hardness during storage to increase the breaking load, which inhibits the germinated bud or root from sticking out. On the other hand, if the former concentration is too much lower than the latter concentration, the strength of the gel coat is reduced during storage. Accordingly, the metal ion concentration in the storage solution should be adjusted depending on that of the solution for coagulation. A preferred metal ion concentration in the storage solution is usually 0.001 to 0.6% by weight, and still preferably 0.005 to 0.06% by weight for obtaining higher effects.

The metal ions for coagulation which can be used in the invention include divalent metal ions, such as a calcium ion and a barium ion, and an aluminum ion. These metal ions are usually added to the storage solution in the form of a chloride.

It is required that the storage solution has such an osmotic pressure that gives substantially no adverse influence on the compressive breaking strength of the gel coat. The term "substantially" as used here is explained below. The gel coat of a gel-coated seed which has been adjusted to have a hardness appropriate for the seed sometimes undergoes change in compressive breaking strength when immersed in a storage solution. This being the case, as far as the compressive breaking strength after the storage is within 70 to 130% of the initial compressive breaking strength, the osmotic pressure of the storage solution is regarded to have an osmotic pressure that gives substantially no adverse influence on the compressive breaking strength of the gel coat.

When gel-coated seeds are stored in a storage solution having such an osmotic pressure, the gel-coated seeds undergo substantially no change in properties except compressive breaking strength, such as visibility and size of the encapsulated seed, and the surface conditions of the gel coat, as compared with the gel-coated seeds immediately after preparation. Thus, there is no mistaking in observing the germination, which may lead to an error of judgement of the proper time of planting. Because the size of the gel-coated seed is also substantially unchanged, various parts of a planting machine, such as a grating, as designed for gel-coated seeds immediately after preparation can be used in common for the gel-coated seeds after storage.

For osmotic pressure control, the storage solution may contain various compounds other than the metal ion for coagulation. Compounds useful to this effect include non-ionic substances (e.g., polyethylene glycol), sodium chloride, potassium nitrate, and ammonium sulfate. It should be noted that a choice of the compound to be added be made so as not to adversely affect the gel coat and the encapsulated seed. Of the above-mentioned compounds, potassium nitrate and ammonium sulfate are preferred, for they serve as a fertilizer component after planting to accelerate growth of the plant.

An osmotic pressure is generally obtained by van't Hoff's equation. Furthermore, the composition of a storage solution having an osmotic pressure that gives no substantial influence on the compressive breaking strength of the gel coat as mentioned above can be obtained through a preliminary experiment as follows.

Aqueous solutions having a varied osmotic pressure are prepared by mixing the above-mentioned salts in a varied ratio, and a small amount of gel-coated seeds are immersed in each solution for one week at a prescribed storage temperature. The change in breaking strength of the gel-coated seeds due to the immersion is examined, and those solutions in which the gel-coated seeds show a rate of change in breaking strength within ±30% are selected. The above-described preliminary experiment for deciding the composition of a storage solution may be carried out using gel capsules containing no seed in place of gel-coated seeds.

In the present invention, gel-coated seeds are stored at a storage temperature controlled at 0° to 10° C. Some storage solutions may not freeze at temperatures below 0° C. because of the presence of a solute, but such low temperatures tend to adversely affect germination of the seeds. Therefore, the storage temperature should be 0° C. or higher. The allowable storage period is extended at temperatures of 10° C. or lower, while varying depending on the kind of seeds. Temperatures of from 0° to 5° C. are recommended for obtaining the best results.

The present invention provides a method of storing gel-coated seeds having a gel coat comprising an aqueous gel which has been water-insolubilized with a metal ion. The present invention makes it possible to store the gel-coated seeds while preventing evaporation loss of water from the gel coat thereby maintaining a water content necessary for germination.

Since the gel-coated seeds stored according to the present invention for about 20 days can retain the characteristics of the gel coat thereof, i.e., size, surface conditions, and visibility of the encapsulated seeds, they can be handled in the same manner as for those immediately after preparation. Therefore, a series of operations of from coating with gel to planting can be carried out efficiently. The gel-coated seeds thus stored exhibit equal rate of germination and rate of sticking out to those of the gel-coated seeds immediately after preparation.

In addition, the storage method of the invention requires no expensive chemicals such as water-absorbing polymers and is therefore very economical.

The present invention will now be illustrated in greater detail with reference to Examples, but it should be understood that the invention is not deemed to be limited thereto. Unless otherwise indicated, all the percents are by weight.

EXAMPLES

Decision of Composition of Storage Solution

Droplets of a 3% aqueous solution of sodium alginate were dropped in a 10% aqueous solution of calcium chloride to prepare 100 water-insoluble gel capsules having a diameter of 10 mm.

The breaking load of 20 gel capsules out of 100 was measured with a rheometer equipped with a 2 kgf load cell. In more detail, filter paper for non-slip was placed on the lower disc stage of the measuring part of the rheometer, and a sample gel capsule was put thereon. The lower stage was lifted to crush the sample by compression with the upper disc stage. A breaking strength was obtained from the stress-strain curve. Measurement was made for 20 gel capsules to obtain an average.

The rest of the gel capsules were immersed in a 0.08% aqueous solution of calcium chloride kept at 5° C. for 7 days. Thereafter, the breaking load of the gel capsules was measured in the same manner as described above. As a result, the average breaking load of the immersed gel capsules was found to be within ±20% of that of the gel capsules as measured immediately after preparation. The 0.08% calcium chloride aqueous solution was thus proved suitable as a storage solution to be used in Example.

Example 1 and Comparative Examples 1 and 2

A droplet of a 3% sodium alginate aqueous solution was formed at the tip of a capillary, and a radish seed was introduced into the droplet by making use of the hollow part of the capillary. Each droplet containing one seed was dropped in a 10% aqueous solution of calcium chloride to prepare 2500 water-insolubilized gel-coated seeds having a diameter of 10 mm (hereinafter designated gel-coated seeds A).

Measurement of the breaking load of 20 gel-coated seeds A out of 2500 gave an average of 0.5 kgf. A hundred gel-coated seeds A weighed 88 g in average.

In a 0.08% calcium chloride aqueous solution were immersed 700 gel-coated seeds A and refrigerated at 2° C. (Example 1).

For comparison, 700 gel-coated seeds A were refrigerated as such at 2° C. and 55% RH (Comparative Example 1), and 1000 gel-coated seeds A were stored as such in a thermo-hygrostat at 20° C. and 65% RH.

The breaking load and the weight (for 100) of these gel-coated seeds after 3, 7, 10, and 20 days storage. The weight of gel-coated seeds is a measure of change in water content of the gel coat.

Furthermore, 100 gel-coated seeds A each of Example 1 and Comparative Examples 1 and 2 after 20 days' storage were planted on a dish having a diameter of 12 cm and kept in the dark at 20° C. The rate of germination and rate of sticking out (bud's or root's sticking out through the gel coat) were examined everyday for consecutive 7 days.

The results obtained are shown in Tables 1 to 4 below.

TABLE 1

| | Change of Breaking Load (kgf) | | |
|---|---|---|---|
| Time of Storage | Example 1 | Compara. Example 1 | Compara. Example 2 |
| Immediately after preparation | 0.58 | 0.57 | 0.56 |
| 1 day | — | 0.71 | 0.86 |
| 2 days | — | 0.92 | unmeasurable* |
| 3 days | 0.60 | 1.51 | " |
| 4 days | — | unmeasurable* | " |

TABLE 1-continued

Change of Breaking Load (kgf)

| Time of Storage | Example 1 | Compara. Example 1 | Compara. Example 2 |
| --- | --- | --- | --- |
| 7 days | 0.59 | * | * |
| 10 days | 0.61 | * | * |
| 20 days | 0.60 | * | * |

Note: *The breaking load was too high to be measured with a load cell of 2 kgf.

TABLE 2

Weight of 100 Gel-Coated Seeds (g)

| Time of Storage | Example 1 | Compara. Example 1 | Compara. Example 2 |
| --- | --- | --- | --- |
| Immediately after preparation | 87.4 | 87.4 | 87.5 |
| 1 day | — | 70.2 | 60.9 |
| 2 days | — | 63.2 | 43.6 |
| 3 days | 87.5 | 55.1 | 26.6 |
| 4 days | — | 18.2 | 13.6 |
| 7 days | 87.2 | 5.9 | 3.7 |
| 10 days | 87.1 | 4.2 | 3.7 |
| 20 days | 87.3 | 3.7 | 3.7 |

TABLE 3

Rate of Germination (%)

| Time of Storage | Example 1 | Compara. Example 1 | Compara. Example 2 |
| --- | --- | --- | --- |
| Immediately after preparation | 3 | 3 | 21 |
| 1 day | 14 | 3 | 21 |
| 2 days | 92 | 3 | 18 |
| 3 days | 98 | 2 | 18 |
| 4 days | 98 | 2 | 18 |
| 5 days | 98 | 2 | 18 |
| 6 days | 98 | 2 | 18 |
| 7 days | 98 | 2 | 18 |

TABLE 4

Rate of Sticking out (%)

| Time of Storage | Example 1 | Compara. Example 1 | Compara. Example 2 |
| --- | --- | --- | --- |
| Immediately after preparation | 0 | 0 | 0 |
| 1 day | 4 | 0 | 0 |
| 2 days | 56 | 0 | 0 |
| 3 days | 83 | 0 | 0 |
| 4 days | 95 | 0 | 0 |
| 5 days | 96 | 0 | 0 |
| 6 days | 96 | 0 | 0 |
| 7 days | 97 | 0 | 0 |

The results in Tables 1 to 4 show that the gel-coated seeds stored by the method of the invention do not lose the water content in their gel coat, so that the rate of germination of the encapsulated seeds is not reduced. Since the breaking strength of the gel coat does not increase during the storage, the rate of sticking out is not reduced.

Any of the gel-coated seeds of Example 1 which had been stored for 3, 7, 10 or 20 days showed neither change of the surface conditions, such as peeling or cracks, nor change of size. The stored gel-coated seeds were utterly equal to those immediately after preparation in visibility of the encapsulated seeds.

While the invention has been described in detail and with reference to specific examples thereof, it will be apparent to one skilled in the art that various changes and modifications can be made therein without departing from the spirit and scope thereof.

What is claimed is:

1. A method for storing gel-coated seeds having a gel coat comprising an aqueous gel having been water-insolubilized by a metal ion in a coagulating solution, which comprises storing the gel-coated seeds in an aqueous solution containing said metal ion, said aqueous solution containing said ion at a lower concentration than in said coagulation solution, wherein the aqueous solution has an osmotic pressure that provides substantially no influence on compressive breaking strength of the gel coat, and the gel-coated seeds are stored at a temperature of from 0° to 10° C.

2. The method as claimed in claim 1, wherein the aqueous gel comprises sodium alginate or sodium polyacrylate.

3. The method as claimed in claim 1, wherein the concentration of the metal ion in the aqueous solution is from 0.001 to 0.6% by weight.

4. The method as claimed in claim 1, wherein the metal ion is selected from the group consisting of a calcium ion, a barium ion, and an aluminum ion.

5. The method as claimed in claim 1, wherein the aqueous solution further contains polyethylene glycol, sodium chloride, potassium nitrate, or ammonium sulfate.

* * * * *